US007483251B2

(12) United States Patent
Davis et al.

(10) Patent No.: US 7,483,251 B2
(45) Date of Patent: Jan. 27, 2009

(54) MULTIPLE PLANAR INDUCTIVE LOOP SURGE SUPPRESSOR

(75) Inventors: Howard Davis, Clarendon Hills, IL (US); Kendrick Van Swearingen, Woodridge, IL (US)

(73) Assignee: Andrew LLC, Hickory, NC (US)

( * ) Notice: Subject to any disclaimer, the term of this patent is extended or adjusted under 35 U.S.C. 154(b) by 339 days.

(21) Appl. No.: 11/306,872

(22) Filed: Jan. 13, 2006

(65) Prior Publication Data

US 2007/0165352 A1 Jul. 19, 2007

(51) Int. Cl.

| | |
|---|---|
| ***H01C 7/12*** | (2006.01) |
| ***H02H 1/00*** | (2006.01) |
| ***H02H 1/04*** | (2006.01) |
| ***H02H 3/22*** | (2006.01) |
| ***H02H 9/06*** | (2006.01) |

(52) U.S. Cl. ...................................................... 361/119

(58) Field of Classification Search .................. 361/119
See application file for complete search history.

(56) References Cited

U.S. PATENT DOCUMENTS

| | | | |
|---|---|---|---|
| 3,289,117 A | 11/1966 | Kearns et al. | |
| 4,236,188 A | 11/1980 | Prochazka | |
| 4,409,637 A | 10/1983 | Block | |
| 4,525,690 A | 6/1985 | De Ronde | |
| 4,584,624 A | 4/1986 | Hines | |
| 4,701,825 A | 10/1987 | Pagliuca | |
| 5,053,910 A | 10/1991 | Goldstein | |
| 5,745,328 A | 4/1998 | Bellantoni | |
| 5,982,602 A | 11/1999 | Tellas et al. | |
| 6,061,223 A * | 5/2000 | Jones et al. | 361/119 |
| 6,101,080 A | 8/2000 | Kuhne | |
| 6,236,551 B1 | 5/2001 | Jones et al. | |
| 6,452,773 B1 | 9/2002 | Aleksa et al. | |
| 6,636,408 B2 | 10/2003 | Pagliuca | |
| 6,688,916 B1 | 2/2004 | Lee | |
| 6,721,155 B2 | 4/2004 | Ryman | |
| 6,785,110 B2 | 8/2004 | Bartel et al. | |
| 7,324,318 B2 * | 1/2008 | Harwath et al. | 361/119 |
| 2004/0042149 A1 * | 3/2004 | Devine et al. | 361/119 |
| 2004/0100751 A1 | 5/2004 | Ammann | |
| 2004/0169986 A1 * | 9/2004 | Kauffman | 361/119 |

* cited by examiner

*Primary Examiner*—Stephen W Jackson
*Assistant Examiner*—Lucy Thomas
(74) *Attorney, Agent, or Firm*—Babcock IP, PLLC

(57) ABSTRACT

An in-line surge suppressor having a body with a bore. The body formed from a first portion and a second portion dimensioned to couple together. An inner conductor positioned within the bore and a shorting element extending between the inner conductor and the body. The shorting element having at least two loop segments, each of the loop segments arranged in a separate plane. Each of the loop segments interconnected with at least one other loop segment by a transition section.

18 Claims, 6 Drawing Sheets

MULTIPLE PLANAR INDUCTIVE LOOP SURGE SUPPRESSOR

BACKGROUND

1. Field of the Invention

The invention generally relates to surge protection of coaxial cables and transmission lines. More particularly, the invention relates to a compact surge protector with a high current capacity, for use in-line with a coaxial cable or transmission line, configurable for operation in a range of different frequency bands.

2. Description of Related Art

Electrical cables, for example coaxial transmission lines of antenna towers, are equipped with surge suppression equipment to provide an electrical path to ground for diversion of electrical current surges resulting from, for example, static discharge and or lightning strikes.

Prior coaxial suppression equipment typically incorporated a frequency selective shorting element between the inner and outer conductors dimensioned to be approximately one quarter of the frequency band center frequency in length, known as a quarter wavelength stub. Therefore, frequencies within the operating band pass along the inner conductor reflecting in phase from the quarter wavelength stub back to the inner conductor rather than being diverted to the outer conductor and or a grounding connection. Frequencies outside of the operating band, such as low frequency surges from lightning strikes, do not reflect and are coupled to ground, preventing electrical damage to downstream components and or equipment.

Depending upon the desired frequency band, a shorting element dimensioned as a quarter wavelength stub may have a required dimension of several inches, requiring a substantial supporting enclosure. Where the supporting enclosure and any necessary interface to the surge suppressor body are not machinable along a single longitudinal axis of the surge suppressor body, additional manufacturing costs are incurred. Prior quarter wavelength stub surge suppressors, such as described in U.S. Pat. No. 5,982,602 "Surge Protector Connector" by Tellas et al, issued Nov. 9, 1999 commonly owned with the present application by Andrew Corporation and hereby incorporated by reference in the entirety, are largely machinable along a single longitudinal axis of the surge suppressor body and also reduce the required enclosure size by spiraling the shorting element away from the inner conductor to a nearly full circumference loop around the inner conductor.

However, because the shorting element requires sufficient cross sectional area to carry the desired surge current load, and requires a suitable separation from the other elements to prevent flashover during a surge condition, the required enclosure is still relatively large and necessarily introduces a significant variation to the outer conductor diameter as it passes along the body of the surge suppressor. Variations in the outer conductor diameter introduce an impedance discontinuity that increases insertion losses. Also, the shorting element is coupled to the outer conductor via a slidable slot connection, secured by a screw that increases manufacturing complexity and also introduces a weak point in the electrical interconnection with the outer conductor.

Alternative shorting elements in other prior surge suppressors include a single planar spiral with multiple loops that requires an increased body diameter to maintain the required spacing between the loops. Similarly, a helical coil shorting element configuration is expensive to manufacture with precision and requires a significant extension of the longitudinal dimension of the surge suppressor.

The spiral aspect of the shorting element is an inductor structure that increases the inductance of the shorting element. The high frequency magnetic field effects of an inductor structure having an affect on the impedance of the frequency selective shorting element that allows the overall length of the shorting element to be reduced, compared to a straight or minimally spiraled quarter wavelength stub. Precision manufacture by machining or bending of a range of different spiral inductor shorting element configurations, to allow supply of a surge suppressor optimized for each of a range of different frequency bands, adds a significant manufacturing cost and lead time to the resulting family of surge suppressors.

Competition within the electrical cable, connector and associated accessory industries has focused attention on cost reductions resulting from increased manufacturing efficiencies, reduced installation requirements and simplification/overall number of discrete parts reduction.

Therefore, it is an object of the invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The prior less than single turn spiral into loop shorting element is replaced by a shorting element with multiple planar loops, each of the planar loops coupled by a transition section. Because the multiple planar loops are arranged generally in-line and normal to the inner conductor, the effective length of the shorting element may be increased without requiring a corresponding increase in the enclosing housing diameter.

Figure 1:
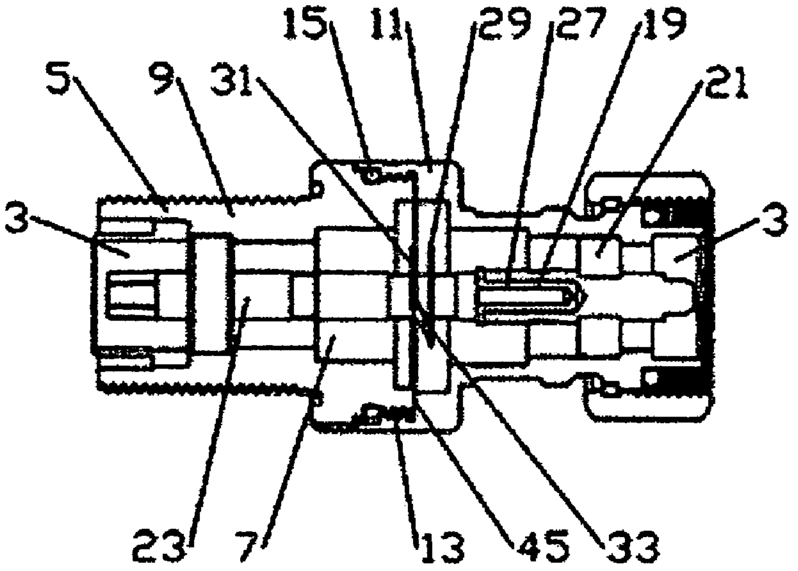
FIG. 1 is a cross sectional side schematic view of an exemplary embodiment of the invention.
Figure 12:
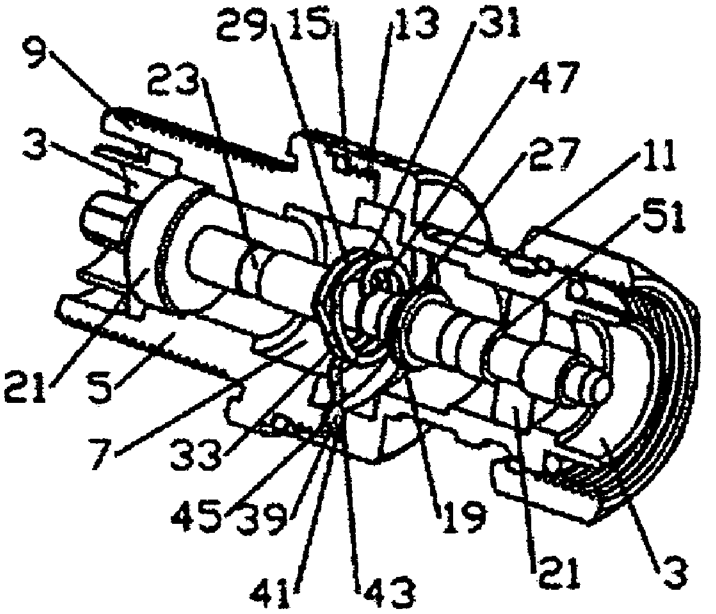
FIG. 12 is a cut-away angled side schematic isometric alternative embodiment including 3 loops and an example of a narrow and a wide angled transition.
Figure 13:
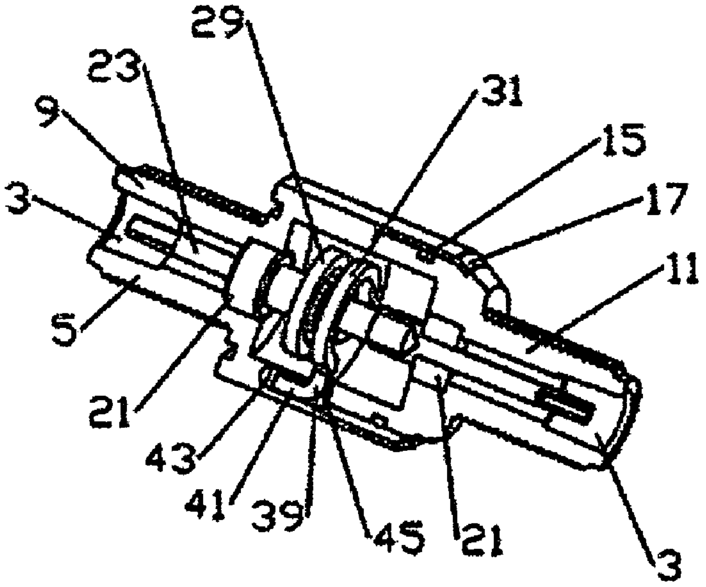
FIG. 13 is a cut-away angled side schematic isometric alternative embodiment including a square cross section shorting element and bent end key into slot outer conductor coupling.

Exemplary embodiments of the invention are described with reference to FIGS. 1-13. As shown in FIG. 1, a surge suppressor 1 according to the invention may be adapted for use in-line with a coaxial cable, having desired cable and or coaxial connector interface (s) 3 at each end, here demonstrated as standard male and female DIN connector interface(s) 3. A surge suppressor body 5 with a hollow central bore 7 is formed in complementary first and second portion(s) 9, 11 dimensioned to mate together. The coupling of the first and second portion(s) 9, 11 may be via, for example thread(s) 13 environmentally sealed by a gasket 15 such as an o-ring. In an alternative embodiment, as shown in FIG. 13, the coupling of the first and second portion(s) 9, 11 may be via interference fit and or a swaged over crimp connection 17. FIG. 13 also demonstrates use of an alternative connector interface(s) 3, female type N.

An inner conductor 23 extends coaxially within the hollow central bore 7 between each end of the body 5, supported by insulator(s) 21. A break 19 in the inner conductor 23, for example separated by a dielectric 27 may be applied as a direct current isolator. The surface area of each end of the inner conductor 23 at the break 19 and the thickness and dielectric value of any dielectric 27 applied are adapted for a desired impedance over a desired frequency band, such as 50 ohms, and an acceptable insertion loss.

A shorting element 29 is coupled between the body 5 (outer conductor) and the inner conductor 23 on the side of the break 19, if present, from which a current surge is expected to originate. The shorting element 29 extends from the inner conductor 23 towards the body 5 and forms a generally planar loop segment 31 spaced away from the inner conductor 23. A transition section 33 leads to at least one additional planar loop segment 31 spaced along the inner conductor 23. An end of the last planar loop segment 31 extends towards and couples with the outer conductor, that is the body 5.

Figure 2:
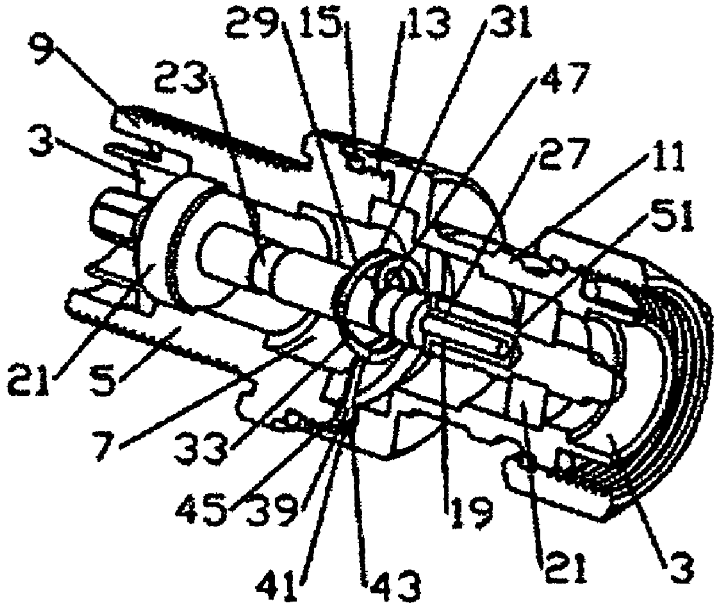
FIG. 2 is a cut-away angled side schematic isometric view of FIG. 1.
Figure 3:
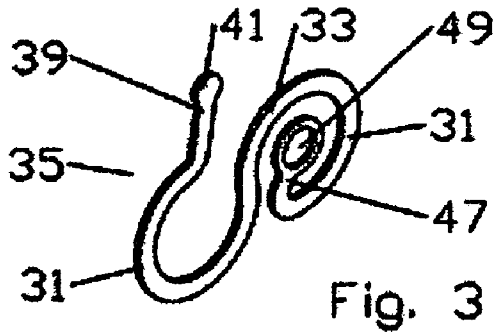
FIG. 3 is an angled side schematic isometric view of a shorting element in preliminary planar form.
Figure 4:
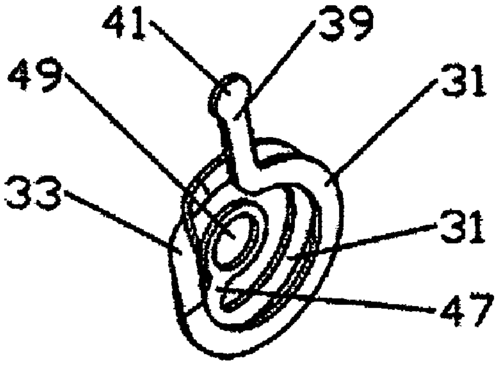
FIG. 4 is an angled side schematic isometric view of FIG. 3, after bending operations to form the shorting element.
Figure 5:
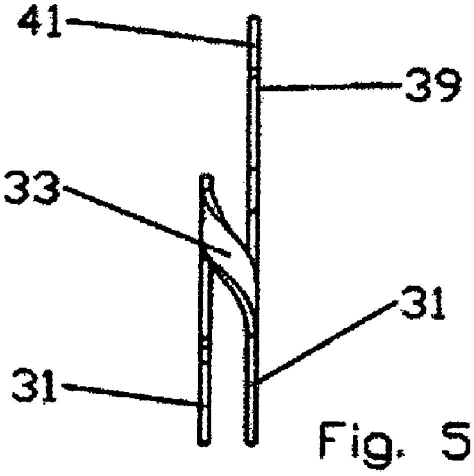
FIG. 5 is a schematic end view of FIG. 4.

According to the invention, any shorting element 29 configuration having multiple planar loop segment(s) 31, the planar loop segment(s) 31 each joined by a transition section 33, may be applied. For example as shown in FIG. 2, the transition section 33 between two planar loop segment(s) 31 may be formed by bending a contiguous planar preliminary form 35, for example a metal stamping as shown in FIG. 3, along the transition section 33 as shown in FIGS. 4 and 5. Although a simple contiguous planar metal stamping is the preliminary form 35, a complex precision multi-planar shape with desired spacing between adjacent planar loop segment(s) 31, the inner conductor 23 and the body 5 is obtained from a single bending manufacturing operation. Bending, as used herein, includes any bending and or rotation action which results in the transformation of contiguous and initially co-planar elements into separate planes at either side of a transition section 33.

Figure 6:
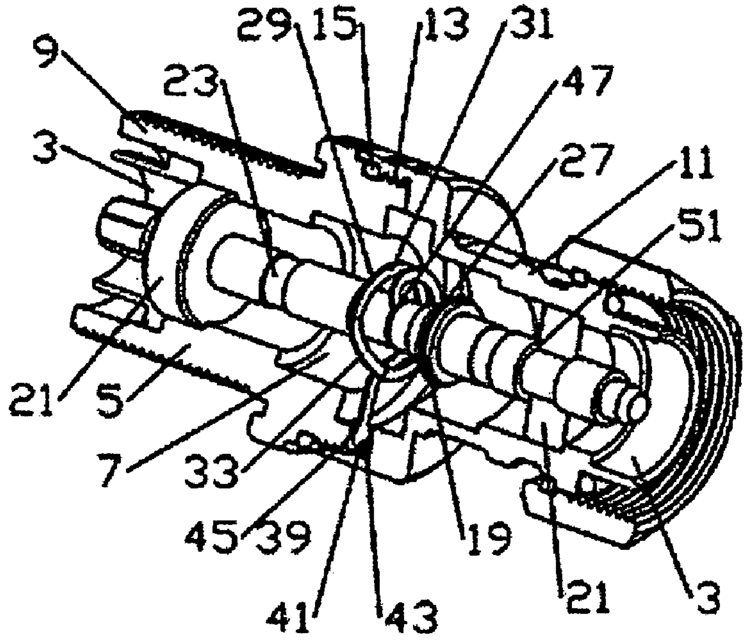
FIG. 6 is a cut-away angled side schematic isometric alternative embodiment including an angled transition.
Figure 7:
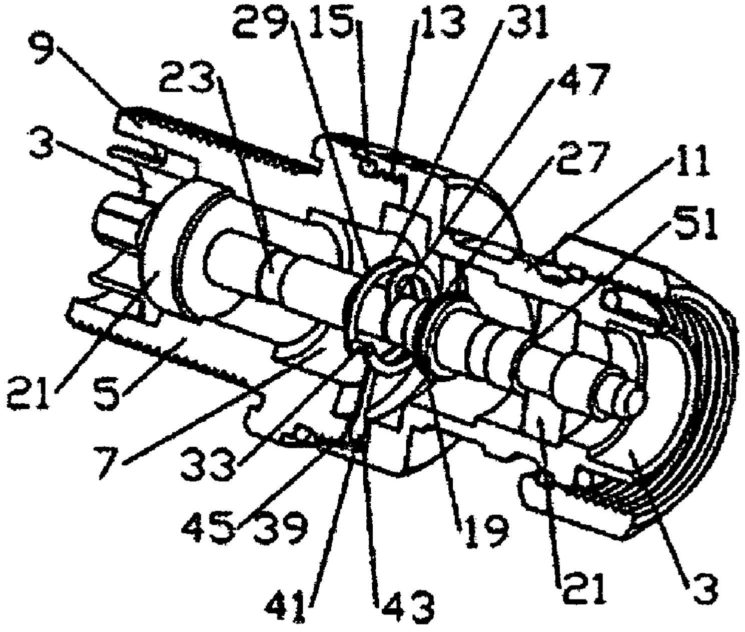
FIG. 7 is a cut-away angled side schematic isometric alternative embodiment including a separate transition element between loops with a common orientation.
Figure 8:
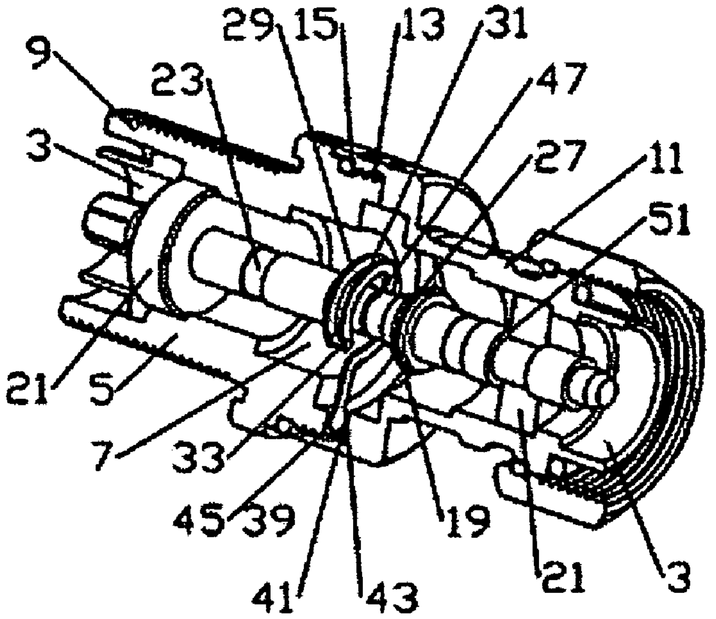
FIG. 8 is a cut-away angled side schematic isometric alternative embodiment including a separate transition element between loops with a reverse orientation.

Alternatively, as shown for example in FIG. 6, the transition section may be formed from other than a planar preliminary form via a winding operation and or by separately formed multiple loop segment(s) 31 interconnected at the transition section(s) 33 by any of a number of methods such as brazing, welding or riveting.

Where a separate transition section 33 element connection is applied, the direction of the loop segment(s) 31 may be continuous, encircling the inner conductor 23 as shown in FIG. 7, or it may reverse at the transition section 33 element in a mirror orientation with respect to the transition section 33, as shown for example in FIG. 8.

Figure 9:
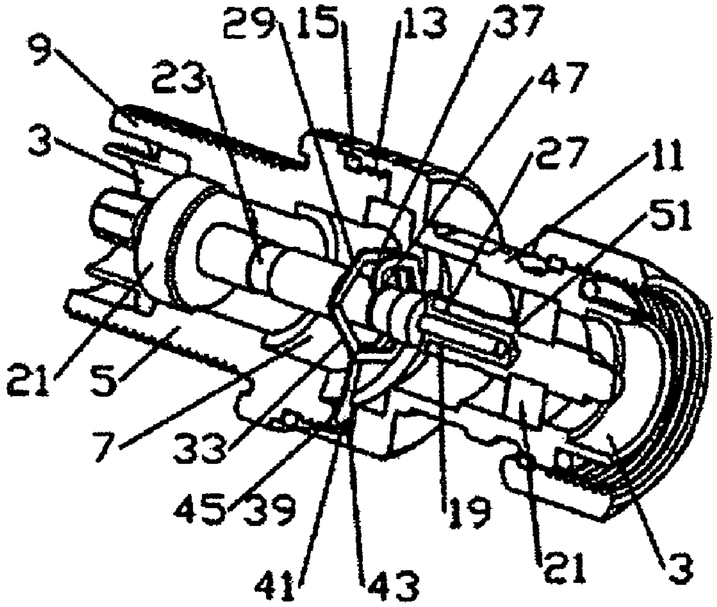
FIG. 9 is a cut-away angled side schematic isometric alternative embodiment including a shorting element with linear segments.
Figure 10:
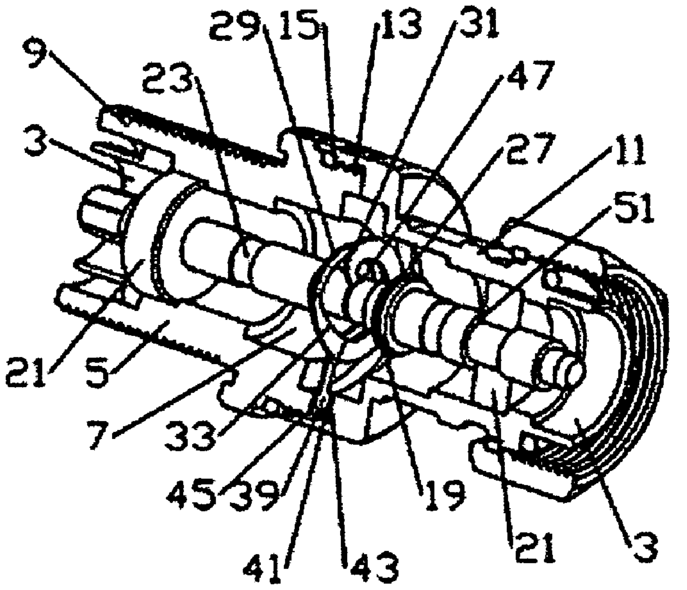
FIG. 10 is a cut-away angled side schematic isometric alternative embodiment including a shorting element with a varying cross sectional area.

As shown for example in FIG. 9, the loop segment(s) 31 may be formed from a series of linear segment(s) 37 and or a combination of linear segment(s) 37 and arc segments. Also, the cross sectional area of the loop segment(s) 31 may be constant or varied according to the desired electrical characteristics, for example as shown in FIG. 10. Although the embodiments of FIGS. 1-12 are demonstrated with a generally rectangular shorting element 29 cross section, for maximum current capacity a circular or square cross section may be applied. However, applying wider shorting element 29 cross section(s) may require extending the longitudinal dimension of the enclosing body 5, as shown in FIG. 13.

Figure 11:
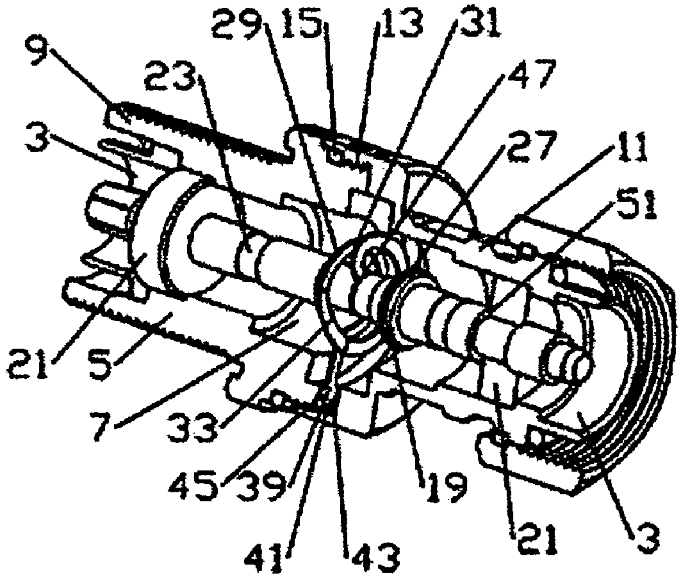
FIG. 11 is a cut-away angled side schematic isometric alternative embodiment including a shorting element with a varying radius.

Further, the loop segment(s) 31 may have varying diameters, for example as shown in FIG. 11. A varying loop segment 31 diameter may be useful where tight arc segment radiuses are not desired proximate the loop portions extending from the inner conductor 23 and towards the body 5.

The overall length obtained via the loop segment 31 configurations may be tuned to adapt the resulting surge suppressor 1 according to the invention for operation about a desired frequency band with at least two planar loop segment(s) 31 coupled by a transition section 33. Each loop segment 31 may extend as far as desired around the inner conductor 23 with a maximum loop just short of a full circumference to prevent shorting of the same loop segment 31 ends to each other. FIG. 12 is an example of a three loop segment 31 configuration with both long and short transition section(s) 33.

For the body 5 to shorting element 29 coupling, a distal end 39 of the shorting element 29 may be formed with a key 41 into slot 43 connection. The key 41 and slot 43 may be, for example, corresponding circular shapes for ease of manufacture. The slot 43 is any form of hole, groove or depression that may be formed in a seating surface 45 between the first and second portion(s) 9,11 with a depth slightly less than a thickness of the shorting element 29, so that the shorting element 29 protrudes from the slot 43 when seated. Thereby, the coupling of the first and second portions 9,11 coming together along the seating surface 45 also drives the key 41 into the slot 43 to produce a removable, reliable and high current capacity electrical interconnection. Alternatively, an interference fit between the key 41 and slot 43 or other connection method may be applied.

The proximal end 47 of the shorting element 29 may apply a similar key 41 into slot 43 connection with respect to the inner conductor 23. Alternatively, a mounting hole 49 that fits over a threaded or interference fit break in the outer conductor 23 may be applied as best shown in FIGS. 3-5. Threading the two portions of the inner conductor 23 together produces a removable, reliable and high current capacity electrical interconnection.

An alternative key 41 into slot 43 interconnection, as shown in FIG. 13, may be formed by bending the distal and or proximal end(s) 39, 47 of the shorting element 29 and forming the co-operating slot(s) 43 to receive the bent portion "key" 41 which is then securely retained in place by the corresponding clamping portion, as described above.

Returning to the break 19, the specific configuration of this element may also be applied in several different configurations. As shown in FIGS. 1, 2 and 9, the break 19 may be a pin into socket configuration with a corresponding dielectric 27 cap (thickness increased for schematic clarity) that fits into the socket or over the pin, prior to final assembly. The dielectric 27 may also be formed as a cylindrical dielectric sleeve and other spacing means applied to prevent the opposing sections of the inner conductor 23 not covered by the cylindrical dielectric 27 sleeve from contacting each other, such as stop(s) 51 in the inner conductor 23 against which each insulator 21 abuts.

Alternatively, the break 19 may be formed with a dielectric 27 located between opposing planar disk electrodes as shown for example in FIGS. 6-8 and 10-12.

One skilled in the art will appreciate that the present invention represents a significant improvement in the required body 5 dimensions and manufacturing efficiency for in-line coaxial surge suppressor(s) 1. The readily exchangeable surge suppression insert (s) 29 according to the invention may be cost effectively formed by stamping from planar stock and bending operations, permitting precision manufacture of a range of differently dimensioned shorting elements for a wide range of different frequency bands. Because the majority of body 5 features are annular, metal molding and or turning along a single longitudinal axis may efficiently perform the majority of required body manufacturing operations. Also, surge suppressor(s) 1 according to the invention for specific frequency bands may be quickly assembled for on-demand delivery with minimal lead time, eliminating the need for large stocks of pre-assembled frequency band specific surge suppressor 1 inventory. Further, should a surge suppressor 1 be damaged or the desired frequency band of operation change, several embodiments permit the shorting element 29 to be exchanged in the field.

Table of Parts

| | |
|---|---|
| 1 | surge suppressor |
| 3 | interface |
| 5 | body |
| 7 | bore |
| 9 | first portion |
| 11 | second portion |
| 13 | thread |
| 15 | gasket |
| 17 | crimp connection |
| 19 | break |
| 21 | insulator |
| 23 | inner conductor |
| 27 | dielectric |
| 29 | shorting element |
| 31 | loop segment |
| 33 | transition section |
| 35 | preliminary form |
| 37 | linear segment |
| 39 | distal end |
| 41 | key |
| 43 | slot |
| 45 | seating surface |
| 47 | proximal end |
| 49 | mounting hole |
| 51 | stop |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. An in-line surge suppressor device, comprising:

a body having a bore, the body formed from a first portion and a second portion dimensioned to couple together;

an inner conductor positioned within the bore;

a shorting element extending in a serial path between the inner conductor at a proximal end and the body at a distal end;

the shorting element having at least two loop segments; the loop segments each having a radius of curvature generally centered upon the inner conductor;

each of the loop segments arranged in a separate plane; each of the separate planes aligned parallel to one another and normal to a longitudinal axis of the inner conductor; and each of the loop segments interconnected with at least one other loop segment by a transition section.

2. The surge suppressor of claim 1, wherein the transition section includes a bend.

3. The surge suppressor of claim 1, wherein the loop segments encircle the inner conductor with a varying radius.

4. The surge suppressor of claim 1, wherein the loop segments have a varying cross sectional area.

5. The surge suppressor of claim 1, wherein the loop segments comprise a plurality of linear segments.

6. The surge suppressor of claim 1, wherein the transition segment is a separate component.

7. The surge suppressor of claim 1, wherein the loop segments extend end to end encircling the inner conductor.

8. The surge suppressor of claim 1, wherein the loop segments are arranged in a mirror orientation with respect to the transition section.

9. The surge suppressor of claim 1, wherein the shorting element has a square cross section.

10. The surge suppressor of claim 1, wherein the first portion and the second portion are coupled together by a swaged crimp connection.

11. The surge suppressor of claim 1, further including a break in the inner conductor separated by a dielectric.

12. The surge suppressor of claim 11, wherein the break is planar electrodes.

13. The surge suppressor of claim 11, wherein the break is a pin dimensioned to fit into a socket spaced apart from the socket by the dielectric.

14. The surge suppressor of claim 13, wherein the dielectric is a cylindrical sleeve dimensioned to fit over the pin.

15. The surge suppressor of claim 1, wherein the shorting element is coupled to the body by a key formed in the distal end of the shorting element; the key dimensioned to mate with a slot formed in a seating surface between the first portion and the second portion.

16. The surge suppressor of claim 15, wherein the key is formed by bending the distal end of the shorting element 90 degrees.

17. An in-line surge suppressor device, comprising:

a body having a bore, the body formed from a first portion and a second portion dimensioned to couple together;

an inner conductor positioned within the bore;

a shorting element extending in a single path between the inner conductor and the body;

the shorting element having a square cross section and at least two loop segments; each of the loop segments arranged in a separate plane; the separate planes are each aligned parallel to one another and normal to a longitudinal axis of the inner conductor; the loop segments encircling the inner conductor;

each of the loop segments interconnected with at least one other loop segment by a transition section having a bend;

the shorting element coupled to the body by a key dimensioned to fit into a slot formed in a seating surface between the first portion and the second portion.

18. A method of manufacturing a surge suppressor, comprising the steps of:

forming a first portion and a second portion which mate together to form a body having a bore;

positioning an inner conductor within the bore;

stamping a planar preliminary form having a desired pair of loop segments, connected in series, separated by a transition section;

converting the planar preliminary form into a shorting element by bending the loop segments at the transition section to arrange the loop segments into parallel planes; and coupling the shorting element between the inner conductor and the body.

* * * * *